US011132703B2

United States Patent
Koenig

(10) Patent No.: US 11,132,703 B2
(45) Date of Patent: Sep. 28, 2021

(54) PLATFORM FOR PROVIDING AUGMENTED REALITY BASED ADVERTISEMENTS

(71) Applicant: Eric Koenig, Huntington, NY (US)

(72) Inventor: Eric Koenig, Huntington, NY (US)

( * ) Notice: Subject to any disclaimer, the term of this patent is extended or adjusted under 35 U.S.C. 154(b) by 217 days.

(21) Appl. No.: 16/133,647

(22) Filed: Sep. 17, 2018

(65) Prior Publication Data
US 2019/0087842 A1    Mar. 21, 2019

Related U.S. Application Data

(60) Provisional application No. 62/559,487, filed on Sep. 15, 2017.

(51) Int. Cl.
| | |
|---|---|
| *G06Q 30/00* | (2012.01) |
| *G06Q 30/02* | (2012.01) |
| *G06T 19/00* | (2011.01) |
| *G06T 11/60* | (2006.01) |
| *A63F 13/61* | (2014.01) |

(Continued)

(52) U.S. Cl.
CPC ......... *G06Q 30/0209* (2013.01); *A63F 13/61* (2014.09); *A63F 13/655* (2014.09); *G06Q 30/0277* (2013.01); *G06T 11/60* (2013.01); *G06T 19/006* (2013.01); *G06Q 50/01* (2013.01); *G06T 2200/04* (2013.01)

(58) Field of Classification Search
CPC ........... G06Q 30/0209; G06Q 30/0277; G06Q 50/01; A63F 13/61; A63F 13/655; G06T 11/60; G06T 19/006; G06T 2200/04
See application file for complete search history.

(56) References Cited

U.S. PATENT DOCUMENTS

2012/0017141 A1\* 1/2012 Eelen ............... G09B 5/065
715/202
2012/0284081 A1\* 11/2012 Cheng ............... G06Q 30/02
705/7.29

(Continued)

OTHER PUBLICATIONS

Chehimi; Augmented Reality 3D Interactive Advertisements on Smartphones; Management of Mobiel Business IEEE 2007; 8 pages; 2007.\*

(Continued)

*Primary Examiner* — Radu Andrei
(74) *Attorney, Agent, or Firm* — Georgiy L. Khayet

(57) ABSTRACT

Systems and methods for providing augmented reality (AR) advertisements are described herein. An example method may commence with providing, to a user, at least one virtual object via an AR interface. The AR interface may be associated with an application running on an AR-enabled device. The method may further include streaming a gamified interactive content to the AR interface based on user data. The gamified interactive content may be associated with the at least one virtual object and designed to inform and educate the user by providing information about available options and features with regard to a product. The method may continue with analyzing user interactions with the gamified interactive content in response to the information and education provided to the user. The method may further include providing, based on the analysis, rewards to the user according to predetermined rules.

19 Claims, 4 Drawing Sheets

(51) Int. Cl.
    *A63F 13/655*     (2014.01)
    *G06Q 50/00*     (2012.01)

(56) References Cited

U.S. PATENT DOCUMENTS

| | | | |
|---|---|---|---|
| 2012/0291059 A1* | 11/2012 | Roberts | H04N 21/41407 |
| | | | 725/25 |
| 2012/0310717 A1* | 12/2012 | Kankainen | G06Q 30/02 |
| | | | 705/14.4 |
| 2013/0029762 A1* | 1/2013 | Klappert | A63F 13/792 |
| | | | 463/31 |
| 2013/0031579 A1* | 1/2013 | Klappert | H04N 21/454 |
| | | | 725/32 |
| 2013/0235078 A1* | 9/2013 | Takahashi | G06T 11/00 |
| | | | 345/633 |
| 2016/0210602 A1* | 7/2016 | Siddique | G06Q 20/384 |
| 2017/0372522 A1* | 12/2017 | Eronen | G06F 3/04845 |
| 2018/0300952 A1* | 10/2018 | Evans | G06F 3/04845 |
| 2019/0102946 A1* | 4/2019 | Spivack | G06F 3/017 |

OTHER PUBLICATIONS

Chehimi; Augmented Reality 3D Interactive Advertisements on Smartphones; Computer and Information Science IEEE 2016; 5 pages; 2016.*

Stoyanova; Real-time augmented reality shopping platform for studying consume cognitive experiences; 2013 IEEE; 2 pages; 2013.*

* cited by examiner

PLATFORM FOR PROVIDING AUGMENTED REALITY BASED ADVERTISEMENTS

CROSS-REFERENCE TO RELATED APPLICATION

The present utility patent application is related to and claims the priority benefit under 35 U.S.C. 119(e) of U.S. provisional application No. 62/559,487, filed on Sep. 15, 2017, and titled "SYSTEM AND METHOD FOR PROVIDING A PERSONALIZED AND GAMIFIED SEARCH EXPERIENCE THROUGH AN AUGMENTED REALITY PLATFORM." The disclosure of this related provisional application is incorporated herein by reference for all purposes to the extent that such subject matter is not inconsistent herewith or limiting hereof.

TECHNICAL FIELD

The present disclosure relates to data processing and, more particularly, to providing augmented reality based advertisements.

BACKGROUND

A variety of search platforms for conducting online searches through the Internet are available nowadays. When performing the search, search platforms can utilize profiled and personalized data related to an individual requesting the search. The profiled and personalized data of the individual may include age, gender, location, profession, income, hobbies, interests, historical behavior and so forth.

Augmented reality (AR) is a technology used for superimposing a computer-generated image on a view of the real world, thus providing a composite view. This technology is commonly implemented on smartphones, tablets, head-mounted displays, smart glasses, and other mobile devices. AR content may be delivered to the mobile devices either by using markers or via a markerless technology.

The marker tracking allows the use of a digital image to identify graphics and gauge relative orientation of the graphics to a camera on a user device of an individual. The image from the camera as well as a decoded marker identifier are used to add the virtual object into a view of the physical environment as displayed on a screen of the user device. By focusing the camera of the user device on specified markers (i.e., a target, base, or trigger image), an AR application is able to retrieve the information stored remotely on a cloud or on the user device to display the corresponding three-dimensional virtual object.

Markerless AR technology allows for the placement of superimposed virtual objects in any and all parts of the physical environment. When used in smartphones and other digital devices, the markerless AR system typically makes use of a Global Positioning System (GPS) built into the user device in order to locate and interact with the available augmented reality resources. Markerless AR may depend on the physical features of the physical environment surrounding the individual, rather than the standard identifying AR markers (i.e., printed or motion graphics). However, these conventional technologies cannot provide an AR-driven personalized and gamified search experience to engage the individual and further immerse the individual in marketer advertisements.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for providing AR-based advertisements. In some example embodiments, a system for providing AR-based advertisements may include a content module, a processor, and a database communicatively coupled to the processor and storing instructions executable by the processor. The content module may be configured to provide, to a user, at least one virtual object via an AR interface. The AR interface may be associated with an application running on an AR-enabled device. The content module may be further configured to stream gamified interactive content to the AR interface based on user data. The gamified interactive content may be associated with the at least one virtual object. The processor may be configured to analyze user interactions with the gamified interactive content. The processor may be further configured to provide, based on the analysis, rewards to the user according to predetermined rules.

According to some embodiments of the disclosure, a method for providing AR-based advertisements may commence with providing, to a user, at least one virtual object via an AR interface. The AR interface may be associated with an application running on an AR-enabled device. The method may further include streaming gamified interactive content to the AR interface based on user data. The gamified interactive content may be associated with the at least one virtual object. The method may continue with analyzing user interactions with the gamified interactive content. The method may further include providing, based on the analysis, rewards to the user according to predetermined rules.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The disclosure relates to a system for providing AR-based advertisements. The system may act as a personalized search platform with multiple functionalities, such as a search function, a marketing function, and a game function. More specifically, an AR-driven application also referred to as an application may be installed on or streamed to a user device associated with a user. The system may be in communication with the AR-driven application to perform the search function for the user by enabling the user to input a search request related to an item of interest of the user. Furthermore, the system may perform the marketing function by delivering advertising content to the user device based on search terms entered by the user, e.g., in the form of text, photos, graphics, videos, animations, audio, and so forth. Additionally, the system may perform the game function by enabling the user to interact with reward-driven gamified interactive content that may incorporate searched items and advertised items.

The user device may include an AR-enabled device having an AR interface. A virtual object may be provided to the user via the AR interface. In an example embodiment, the virtual object may be provided in response to a search request of the user and associated with an item or product in the search request. Upon providing the virtual object to the AR interface, the system may track user activities related to the virtual object shown on the AR interface. If the system determines that the user is viewing the virtual object, e.g., the user clicks on the virtual object, the system may stream a gamified interactive content related to the virtual object to the AR interface. The gamified interactive content may include, for example, an advertisement related to the virtual object. The system may analyze user interactions in respect of the gamified interactive content and, based on the analysis of the user interactions, provide rewards to the user. The user interactions may include, for example, sharing the gamified interactive content by the user via a social network.

Figure 1:
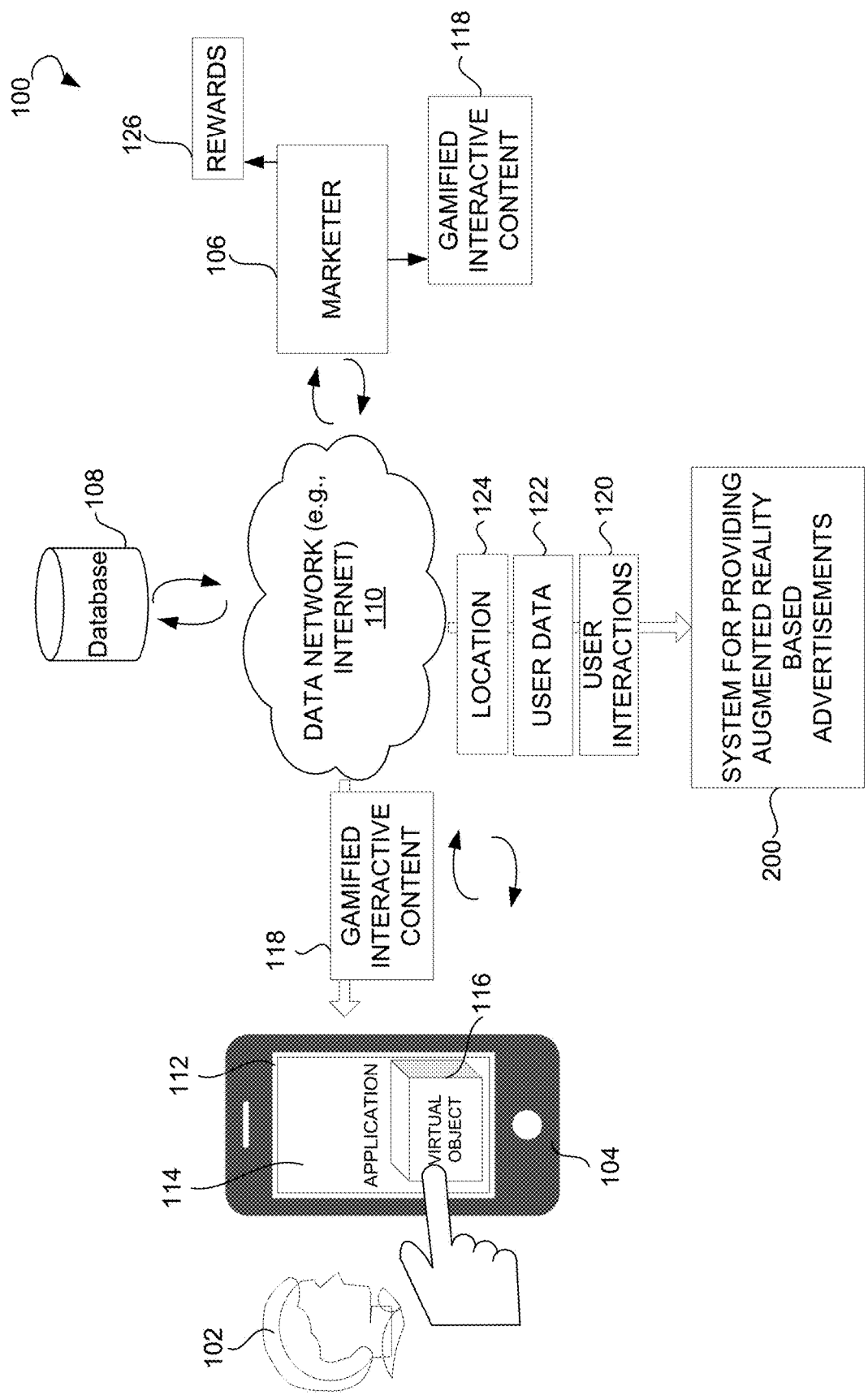
FIG. 1 illustrates an environment within which systems and methods for providing AR-based advertisements can be implemented, according to an example embodiment.

FIG. 1 illustrates an environment 100 within which systems and methods for providing AR-based advertisements can be implemented, in accordance with some embodiments. The environment 100 may include a user 102, a user device (also referred to as an AR-enabled device 104), a system 200 for providing AR-based advertisements (also referred to as a system 200), a marketer 106, a database 108, and a data network 110 (e.g., the Internet or a computing cloud). The AR-enabled device 104, the system 200, the marketer 106, and the database 108 may be connected via the data network 110. The user 102 may be associated with the AR-enabled device 104. The AR-enabled device 104 may include a smartphone, a mobile phone, a tablet, a desktop computer, smart glasses, a head-mounted display, a laptop computer, a game console, a portable game console, TV, web TV, and any other digital device. The AR-enabled device 104 may configured to receive the AR content via either AR markers or through a markerless AR technology.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network can further include or interface with any one or more of an RS-232 serial connection, an IEEE-1394 (FireWire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may be a network of data processing nodes that are interconnected for the purpose of data communication. The network 110 may include any suitable number and type of devices (e.g., routers and switches) for forwarding commands, content, and/or requests from each user 102 to the system 200 and responses back to the user 102.

The AR-enabled device 104 may include an AR interface 112 for displaying AR environments. An application 114 may be running on the AR-enabled device 104 upon downloading and installation. In an example embodiment, the application 114 may be a server-based distributed AR application.

Upon providing a search request by the user 102 for the system 200, the system 200 may response with providing a virtual object 116 to the AR-enabled device 104. The virtual object 116 may relate to an item, product, or topic searched by the user 102 on the search request.

The system 200 may track user interactions 120 with the virtual object 116. Additionally, the system 200 may have access to user data 122 and a location 124 of the AR-enabled device 104. When the user 102 starts interacting with the virtual object 116, the system 200 may provide gamified interaction content 118 related to the virtual object 116 to the AR-enabled device 104. The gamified interaction content 118 may be received from the marketer 106 and selected for the user 102 based on the user data 122. The gamified interaction content 118 may include advertisements related to the virtual object 116. The system 200 may track the user interactions 120 related to the gamified interaction content 118. Based on the user interactions 120 with the gamified interaction content 118, rewards 126 may be provided to the user 102 by the marketer 106.

Figure 2:
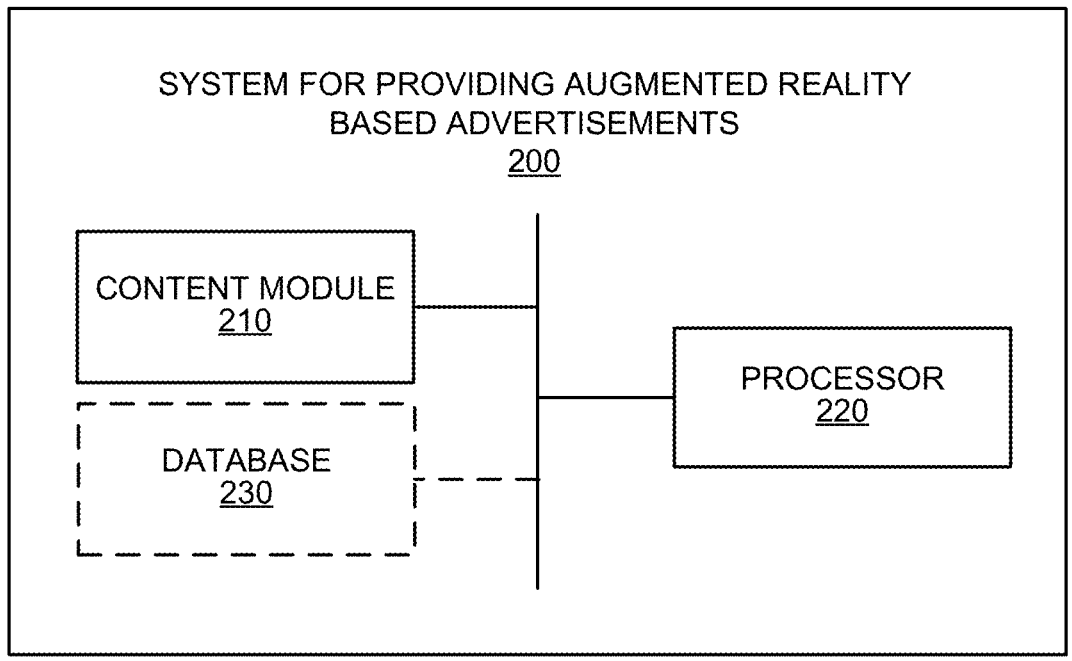
FIG. 2 is a block diagram showing various modules of a system for providing AR-based advertisements, in accordance with certain embodiments.

FIG. 2 is a block diagram showing various modules of a system 200 for providing AR-based advertisements, in accordance with certain embodiments. The system 200 may include a content module 210, a processor 220, and, optionally, a database 220. The database 220 may include computer-readable instructions for execution by the processor 210. The processor 210 may include a programmable processor, such as a microcontroller, central processing unit (CPU), and so forth. In other embodiments, the processor 210 may include an application-specific integrated circuit or programmable logic array, such as a field programmable gate array, designed to implement the functions performed by the system 200. In an example embodiment, the operations of the content module 210 may be performed by the processor 220. In various embodiments, the system 200 may be installed on a user device or may be provided as a cloud service residing in a cloud storage. The system 200 may operate in the form of a platform, preferably operational within a server, which may enable brands, advertisers, sponsors, and marketers (used together or interchangeably herein) to reach their target market in an engaging and gamified consumer search experience driven through immersive AR interactive content and rewards. The operations performed by the content module 210, the processor 220, and the database 230 are described in more detail below with reference to FIG. 3.

Figure 3:
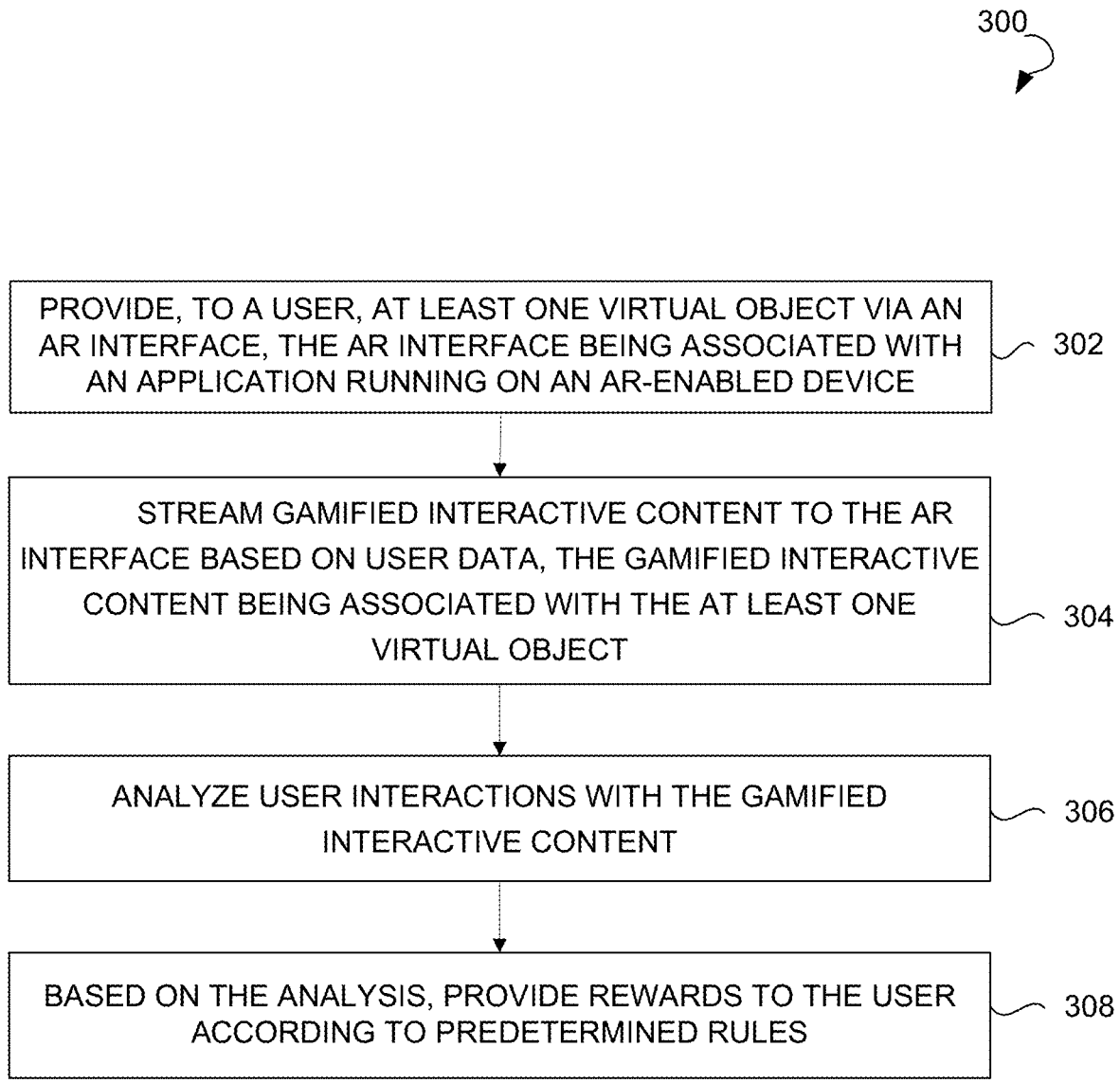
FIG. 3 is a process flow diagram showing a method for providing AR-based advertisements, according to an example embodiment.

FIG. 3 is a process flow diagram showing a method 300 for providing AR-based advertisements within the environment described with reference to FIG. 1. In example embodiments, the operations may be combined, performed in parallel, or performed in a different order. The method 300 may also include additional or fewer operations than those illustrated. The method 300 may be performed by processing logic that comprises hardware (e.g., decision making logic, dedicated logic, programmable logic, and microcode), software (such as software run on a general-purpose computer system or a dedicated machine), or a combination of both.

The method 300 may optionally include receiving a search request from a user. The search request may include, for example, key words related to a product with regard to which the user performs the search. The method 300 may include providing, by a content module, at least one virtual object via an AR interface to the user at operation 302. In some example embodiment, at least one virtual object may be provided to the AR interface in response to a search request of the user. The AR interface may be associated with an application running on an AR-enabled device.

The at least one virtual object may be associated with the product searched by the user. The virtual object can be provided by the marketer and accessible by the user in a variety of different formats or a combination of formats. Specifically, the at least one virtual object may include at least one of the following: a sign, a label, a menu, a sticker, a brochure, a product packaging, a text, a photo, an audio, an infographics, a video, an animation, and a hologram.

In an example embodiment, the marketer may pre-determine which type of an AR trigger the marketer wants to employ to deliver the gamified interactive content to the user. The at least one virtual object may include one of a two-dimensional object and a three-dimensional object. In one embodiment, the marketer may elect to use a three-dimensional object (for example, a box, a pyramid, a cylinder, a sphere, and the like) to provide the AR markers. In this embodiment, the marketer may select the number of sides the marketer wishes to utilize on the three-dimensional object for marketing purposes. Any unused sides can be made available to other marketers/businesses/brands for more potential revenue generating opportunities. The user may rotate the three-dimensional object and corresponding gamified interactive content displayed on the AR interface may change accordingly. For example, one side of the three-dimensional object may present the brand logo, other side may present the search criteria of the user along with profile data of the user, other side may present the advertised products for the user to choose from, other side may present the interface on which the user may select the chosen product, other side may present the rewards earned by the user for this user interaction with the three-dimensional object, and other side may present a retail portal through which the user may redeem the rewards.

In another embodiment, the marketer may elect to use a two-dimensional object (for example, a card, a sign, a label, a sticker, a brochure, and so forth) to provide gamified interactive content to the user. In this embodiment, once the gamified interactive content is triggered by the user interaction with the AR markers on the two-dimensional object, the user can swipe using onscreen touch gestures to move through the corresponding gamified interactive content displayed on the AR interface. For example, after the brand logo is displayed, the user may swipe left on the AR interface to access the search criteria and the profile data of the user, swipe left again to access the advertised products for the user to choose from, swipe left to access the AR interface and select the chosen product, swipe left to view the rewards earned by the user for the user interactions, and swipe left again to access a retail portal through which the user may redeem the rewards.

In yet another embodiment, no AR markers (either two-dimensional or three-dimensional) are required. Instead, the location of the AR-enabled device is determined to display the relevant gamified interactive content based on the location. In this embodiment, other technologies, such as a beacon technology, may be employed to deliver the markerless gamified interactive content to the user. The materials/objects used to trigger the gamified interactive content may have graphics printed directly on the materials/objects, or the materials/objects may be blank and customized by the marketer or the user by applying stickers (permanent) or decals (temporary) to create their own custom triggers.

Additionally, virtual skins (i.e., the AR graphics seen when the gamified interactive content is provided to the user in a 'live' mode) can be customized by the user. Moreover, marketers may offer branded virtual skins to the user to increase their brand exposure. The customized skins may be made available for a fee, or earned through the continued use of the platform (i.e., ongoing engagement) by the user.

The method 300 may further include streaming, by the content module, a gamified interactive content to the AR interface at operation 304. The gamified interactive content to be provided to the user may be selected based on user data. The user data may include profile data, preferences of the user, interests of the user, habits of the user, historical behavior of the user, and so forth. Specifically, the user data may be entered by the user when the user installs an application on the AR-enabled device and creates a user profile. The user data entered by the user may also include needs and desires of the user, i.e., what the user is seeking.

The gamified interactive content may be displayed on one or more surfaces of the at least one virtual object. In an example embodiment, the streaming of the gamified interactive content to the AR interface may be initiated in response to a determination that the user is viewing the at least one virtual object. Alternatively, the marketer may elect to employ a markerless AR technology. In this embodiment, the streaming of the gamified interactive content may be initiated based on a location of the AR-enabled device. The location of the AR-enabled device may be determined, for example, by receiving data from a GPS module of the AR-enabled device.

In other words, when the two-dimensional or three-dimensional virtual object is viewed through the application on the AR-enabled device by the user, the gamified interactive content associated with the at least one virtual object is displayed to the user, or "go live." Once the gamified interactive content is displayed, the user can engage with the gamified interactive content displayed on the AR screen of the AR-enabled device.

In an example embodiment, the gamified interactive content may be associated with at least one of the following: food (e.g., restaurants, bars, clubs, and fast food), media (e.g., music, movies, and TV), entertainment (e.g., live music, nearby activities, and local events), sports (e.g., baseball, football, basketball, hockey, mixed martial arts, professional wrestling, and the National Association of Stock Car Auto Racing), health (e.g., fitness centers, health food stores, hiking trails, and running tracks), and consumer products (e.g., electronics, apparel, utensils, and appliances). In some example embodiments, the gamified interactive content may be designed to inform and educate the user by providing information about available options with regard to a product. The product may be associated with the at least one virtual object and meet the needs and desires entered by the user, i.e., the search criteria or parameters of the search selected by the user. In other example embodiment, the gamified interactive content may include an advertisement provided by the marketer and selected based on the user data.

After reviewing and researching the at least one virtual object, the user may select the available product best suited to meet his or her needs. The user may be able to select, via the application, the product from the presented product array best suited for the user based on user data, search criteria entered by the user, and/or user patterns related to other users. The user may make a selection via a text entry, multiple choice, drag and drop operation, and so forth.

The marketer may pre-determine what item the marketer wants to promote (e.g., products, events, people, locations, deals, and the like) based on profile data, user interaction or proximity with the virtual object, or randomly without relying on any user data. Additionally, the marketer may select the number of products the marketer wants to promote based on these predetermined rules. The marketer can promote a single product, a product line, or an entire brand. Because the gamified interactive content is delivered through the AR, settings selected by the marketer in respect of the products can be changed at a frequency depending on how long the marketer wishes to maintain a marketing campaign. For example, the marketer may determine how long a promotion is run, or how frequently the current promotional campaign is changed (e.g., monthly, bi-monthly, weekly, daily, hourly, at random, and the like).

The method 300 may then continue with analyzing, by a processor, user interactions with the gamified interactive content at operation 306. In an example embodiment, the analysis of the user interactions with the gamified interactive content may include using algorithmic matching of the user data, user interactions, or location of the AR-enabled device with user data or location of other users or historical interactions of the other users.

The analysis of the user interactions with the gamified interactive content may include analysis of one or more of the following: an application use by the user, a duration of user interactions with the gamified interactive content, product viewed by the user, time the user viewed the product, frequency of views of the product or the gamified interactive content by the user, number of times the user shared the gamified interactive content, product selected by the user for purchasing, amount of time the user spent viewing the product, product information the user retains for one or more products, number of products the user purchases, and so forth. In some embodiments, the user interactions may include sharing at least a part of the gamified interactive content via a social network.

The method 300 may optionally include saving, by the processor, the user interactions to a database as well as tracking and recording of how long the user is engaged with each surface of the three-dimensional object so that continued user engagement is rewarded with a higher reward when the user is exposed to surfaces of the at least one virtual object on which a specific sponsored product or message is displayed in the form of the advertisement.

Once a marketer has built a history of preferred items for the product, the marketer may advertise specifically selected items to the user. An algorithmic adaptive logic may be used based on the application usage and user interaction and applied to guide branded/advertised products, messaging, and incentives to users.

The user response with respect to how at least one virtual object is displayed, delivered, and received by the user may be tracked and analyzed. The determined metrics may be made available to the marketer. For the gamified experience designed to increase user engagement, the marketer may choose a level of difficulty of interactions with the gamified interactive content, e.g., 'Easy' like an "open book test" (providing the user with answers in easy-to-find ways) or 'Hard' (requiring users to dig deeper, through active research, for the answers they seek). Additionally, a help feature may be provided within the AR environment to assist users. In some embodiments, the higher is the difficulty of interaction with the gamified interactive content, the higher is the reward that may be provided to the user.

The method 300 may further include providing rewards to the user according to predetermined rules at operation 308. The rewards may be provided to the user based on the analysis of the user interactions with the gamified interactive content. The rewards may be provided by a brand, an advertiser, a sponsor, a marketer, and so forth. In an example embodiment, the predetermined rules may be provided by the brand, the advertiser, the sponsor, and/or the marketer based on the user data, the user interactions, and/or the location of the AR-enabled device.

The user may be incentivized in order to encourage continued and repeated interaction of the user with the gamified interactive content (i.e., in order to increase the level of interaction, duration of interaction, and types of interaction), and to gather useful information for each user regarding user engagement with the gamified interactive content and advertised products (i.e., for data mining purposes). For example, the sharing of content in social networks may be awarded with additional rewards.

The rewards may include one or more of the following: a cash prize, a redeemable reward point, a redeemable reward credit, a product discount, a free product, a trip, an event, and so forth. The reward may be applied to the purchase of the product selected by the user. Alternatively, the reward may be saved for use on other items provided by the marketer. In some embodiments, the rewards may be redeemable through one or more of the following: directly through the application, by directing the user to an online store, by providing the user with the location of the nearest brick-and-mortar store, and so forth. In addition, the user may perform a payment transaction within the application via eCommerce.

The incentives offered by the marketer may increase for the user depending on a number of factors, such as how long the user interacts with the gamified interactive content, how often the user interacts with the gamified interactive content, a number of other users with which the user shares the gamified interactive content, a number of other users with which other users share the gamified interactive content, and the like. All user interactions may be tracked and made available to the marketer.

By collecting data concerning user interactions, marketers may receive the ability to provide the users with targeted advertisements through a gamified search experience driven by the gamified interactive content that is incentivized through rewards redeemable with preferred brands of the users on the items for which the users are searching. Providing the gamified interactive content may be made possible by including AR markers on product packaging, promotional materials and in-store signage, by printing on graphics or stickers, and so forth. In another embodiment, the user may search for product related to unaffiliated businesses, in much the same way the user would search via Google, with results returned via an AR map showing the proximity of the user to the recommended locations.

The advertisements provided by marketers may be associated with a single location, multiple locations under the same brand (i.e., a chain), or a variety of brands in an industry specific or industry agnostic network.

In an example embodiment as applied to the automotive industry, the first AR surface of the virtual object may show a logo and an address of a car dealership, the second AR surface may show search criteria of the user along with preferred types of automobiles and favorite colors of the user, the third AR surface may show the available versions and models currently provided by the dealership to learn more about the available automobiles, the fourth AR surface may show an interface by which the user may select a preferred automobile, the fifth AR surface may show the reward that the user has received for the user interaction (e.g., a free test drive with catered buffet and/or a 15% discount on the interior upgrade package), the sixth AR surface may show the address of the car dealership along with a three-dimensional map of where the user is in proximity to the location of the dealership, in order for the user to redeem their reward.

In an example embodiment as applied to the apparel industry, the first AR surface of the virtual object may show a logo and an address of a clothing retailer, the second AR surface may show each criteria of the user along with preferred styles of fashion, preferred designers/brands, and favorite colors of the user, the third AR surface may show the styles currently available at the clothing retailer to learn more about the available clothing, the fourth AR surface may show an interface by which the user may select the preferred outfit or wardrobe, the AR fifth surface may show the reward that user has received for the user interaction (e.g., a free outfit or a 25% discount on the entire wardrobe), the sixth AR surface may show the address of the clothing retailer, along with a three-dimensional map of where the user is in proximity to the location of the retailer, or an access to their online store, in order for the user to redeem the reward.

In an example embodiment as applied to the herbal medicine/recreation industry, the first AR surface of the virtual object may show a logo and an address of a herbal medicine dispensary, the second AR surface may show the search criteria of the user, along with preferred strains, desired effects and/or medical symptoms of the user, the third AR surface may show the strains currently available at the dispensary to learn more about the available inventory, the fourth AR surface may show an interface by with the user may select the strain or strains, the fifth AR surface screen may show the reward that user has received for the user interaction (e.g., a 25% discount on the selected strain or strains), the sixth AR surface may show the address of the dispensary, along with a three-dimensional map of where the user is in proximity to the location of the dispensary, or an access to their online website, in order for the user to redeem the reward.

In another example embodiment that is industry and market agnostic, a network of a plurality of sponsors/brands/marketers may cross-promote their businesses through the surfaces of the virtual object presented in the form of the gamified interactive content viewed through the application on a mobile device. The user may be at a dispensary, for example, and wish to search for a nearby restaurant to get lunch. In one scenario, the user can access one AR surface of the virtual object through the application and enter search criteria, which may include preferred types of cuisine. In another scenario, the user can access one AR surface of the virtual object through the application but may not need to enter the search criteria because the preferred type of cuisine may be known based on the algorithm and used to match with nearby restaurants that provide that cuisine. In either scenario, the user can get the required information regarding the recommended restaurants and select the one that best fits the search criteria of the user. For this interaction, the user may receive a discount for a free appetizer or 20% off their bill. The user may be then shown the location(s) of the selected restaurant, along with direction and/or three-dimensional map.

The recommendations provided by the system and methods of the present disclosure may be based upon the search inquiries of the user (through both scientific algorithmic matching and social sharing from other users). Scientific recommendations from the algorithms may be based on characteristics of the advertised items, the purchase history of the user and other users who search for or purchase similar items. As the user engages with the system, the machine learning and adaptive logic may update the user profile to include data about preferred items selected by the user and the prior purchase history of the user. This information of the user profile may be used to select similar items to recommend to the user, e.g., "other users who looked for X also looked for Y" or "because you prefer X, we recommend Y because it has similar characteristics." Social recommendations from other users may be based on items the user purchased or items the user searched for, and may include a representations of how other users feel about the items, either through text tags (i.e., terms that may be associated with the item) as well as visual tags (i.e., short video clips that display a visual representation of that item). The tags can be selected from an index, based upon commonly used terms and visuals, or user created content that can be stored in a cloud.

Once a recommendation is received by the user, the user may click on a recommended item to learn more about that item, as well as why it was recommended. For scientific recommendations, the user may be told why the item was selected, based upon the algorithms (i.e., Pandora/Amazon models). For social recommendations, the user may be told why the item was chosen, through the choice of other user of both text tags and visual/video tags.

The recommendations may be delivered to users via a "feed" (or a list of recommendations the users can scroll through, updated in real time or distributed at set times throughout the day). The feed may denote the source of the recommendation, either from the system itself or from other users.

A component of the software utilized to run the system on the user device may track all user interactions and store the user interactions, along with the personal information of the user, in the memory of the device. At predetermined intervals, the stored information may be relayed to a server/cloud, or directly to the marketer. The marketer may utilize the collected information to better distribute advertising content to the users.

Figure 4:
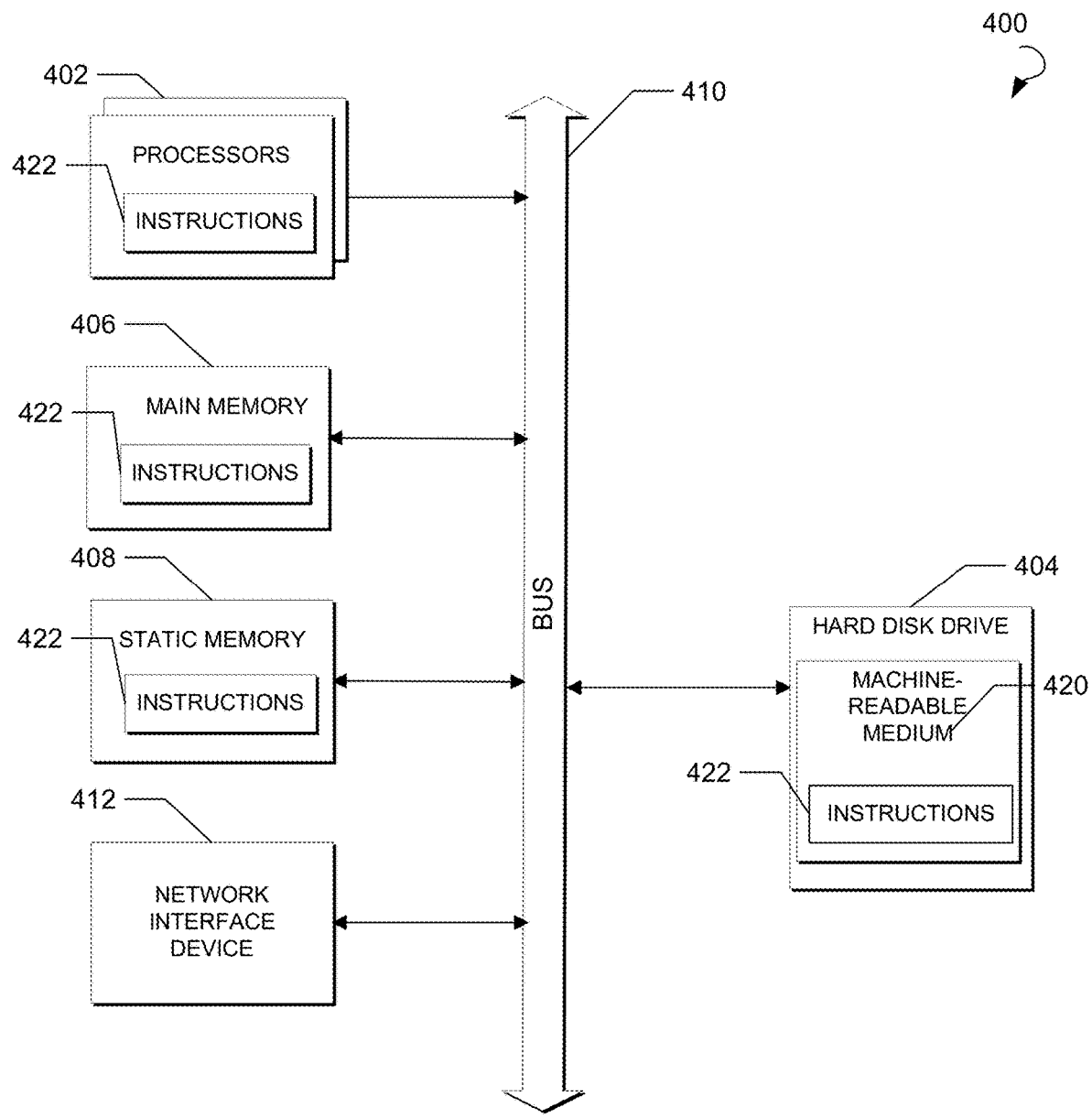
FIG. 4 shows a diagrammatic representation of a computing device for a machine in the exemplary electronic form of a computer system, within which a set of instructions for causing the machine to perform any one or more of the methodologies discussed herein can be executed.

FIG. 4 shows a diagrammatic representation of a computing device for a machine in the exemplary electronic form of a computer system 400, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402, a hard disk drive 404, a main memory 406, and a static memory 408, which communicate with each other via a bus 410. The computer system 400 may also include a network interface device 412. The hard disk drive 404 may include a computer-readable medium 420, which stores one or more sets of instructions 422 embodying or utilized by any one or more of the methodologies or functions described herein. The instructions 422 can also reside, completely or at least partially, within the main memory 406 and/or within the processors 402 during execution thereof by the computer system 400. The main memory 406 and the processors 402 also constitute machine-readable media.

While the computer-readable medium 420 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 400 may be implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Thus, computer-implemented methods and systems for providing AR-based advertisements are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for providing augmented reality (AR) based advertisements, the system comprising:
a processor configured to:
provide, to a user, at least one virtual object via an AR interface, the AR interface being associated with an application running on an AR-enabled device;
stream a gamified interactive content to the AR interface based on user data, the streaming including presenting the gamified interactive content on one or more sides of the at least one virtual object, the gamified interactive content being designed to inform and educate the user by:
providing, within the one or more sides of the at least one virtual object, information associated with a product searched by the user, the information including available options and features associated with the product, the product being searched by the user in a search request, the search request being received from the user;
prompting the user to rotate the at least one virtual object via the AR interface to review the information within the one or more sides of the at least one virtual object;
in response to the rotation of the at least one virtual object, changing the information displayed to the user within the one or more sides of the at least one virtual object; and
prompting the user to provide one or more answers in response to the reviewing the information associated with the product;
receive user interactions with the gamified interactive content in response to the information and education provided to the user, the user interactions including at least the one or more answers received from the user in response to the providing, the information and the education associated with the product;
analyze the user interactions with the gamified interactive content to determine a portion of the information the user retains in association with the product; and
based on the analysis, provide rewards to the user according to predetermined rules; and
a database communicatively coupled to the processor, the database storing instructions executable by the processor.

2. The system of claim 1, wherein the processor is further configured to save the user interactions to the database.

3. The system of claim 1, wherein the at least one virtual object includes at least one of the following: a sign, a label, a menu, a sticker, a brochure, a product packaging, a text, a photo, an audio, an infographics, a video, an animation, and a hologram.

4. The system of claim 1, wherein the least one virtual object includes one of a two-dimensional object and a three-dimensional object.

5. The system of claim 1, wherein the user data includes one or more of the following: profile data, preferences, interests, and a historical behavior of the user.

6. The system of claim 1, wherein the rewards are provided by one or more of the following: a brand, an advertiser, a sponsor, and a marketer.

7. The system of claim 1, wherein the gamified interactive content includes an advertisement.

8. The system of claim 1, wherein the user interactions include sharing at least a part of the gamified interactive content via a social network.

9. The system of claim 1, wherein the rewards include one or more of the following: a cash prize, a redeemable reward point, a redeemable reward credit, a product discount, a free product, a trip, and an event.

10. The system of claim 1, wherein the rewards are redeemable through one or more of the following: the application, an online store, and a brick-and-mortar store.

11. A method for providing augmented reality (AR) based advertisements, the method comprising:
providing, to a user, at least one virtual object via an AR interface, the AR interface being associated with an application running on an AR-enabled device;
streaming a gamified interactive content to the AR interface based on user data, the streaming including presenting the gamified interactive content on one or more sides of the at least one virtual object, the gamified interactive content being designed to inform and educate the user by:
providing, within the one or more sides of the at least one virtual object, information associated with a product searched by the user, the information including available options and features associated with the product, the product being searched by the user in a search request, the search request being received from the user;
prompting the user to rotate the at least one virtual object via the AR interface to review the information within the one or more sides of the at least one virtual object;
in response to the rotation of the at least one virtual object, changing the information displayed to the user within the one or more sides of the at least one virtual object; and
prompting the user to provide one or more answers in response to the reviewing the information associated with the product;
analyzing user interactions with the gamified interactive content in response to the information and education provided to the user to determine a portion of the information the user retains in association with the product, the user interactions including at least the one or more answers received from the user in response to the providing the information and the education associated with the product; and
based on the analysis, providing rewards to the user according to predetermined rules.

12. The method of claim 11, wherein the streaming of the gamified interactive content to the AR interface is performed in response to a determination that the user is viewing the at least one virtual object or based on a location of the AR-enabled device.

13. The method of claim 11, wherein the gamified interactive content is associated with at least one of the following: food, media, entertainment, sports, health, and consumer products.

14. The method of claim 11, wherein the predetermined rules are provided by an advertiser based on one or more of the following: the user data, the user interactions, and a location of the AR-enabled device.

15. The method of claim 11, wherein the gamified interactive content is displayed on one or more surfaces associated with the at least one virtual object.

16. The method of claim 11, wherein the analyzing of the user interactions with the gamified interactive content includes using algorithmic matching with other users and historical interactions of the other users.

17. The method of claim 11, wherein the analyzing of the user interactions with the gamified interactive content includes analyzing one or more of the following: an application use, a length of interaction, a product viewed, a time viewed, frequency of view, and a number of shares.

18. The method of claim 11, wherein the user interactions include sharing at least a part of the gamified interactive content via a social network.

19. A system for providing augmented reality (AR) based advertisements, the system comprising:
a processor configured to:
provide, to a user, at least one virtual object via an AR interface, the AR interface being associated with an application running on an AR-enabled device, wherein the least one virtual object includes one of a two-dimensional object and a three-dimensional object;
stream a gamified interactive content to the AR interface based on user data, the streaming including presenting the gamified interactive content on one or more sides of the at least one virtual object, the gamified interactive content being designed to inform and educate the user by:
providing, within the one or more sides of the at least one virtual object, information associated with a product searched by the user, the information including available options and features associated with the product, the product being searched by the user in a search request, the search request being received from the user;
prompting the user to rotate the at least one virtual object via the AR interface to review the information within the one or more sides of the at least one virtual object;
in response to the rotation of the at least one virtual object, changing the information displayed to the user within the one or more sides of the at least one virtual object; and
prompting the user to provide one or more answers in response to the reviewing the information associated with the product;
wherein the gamified interactive content includes an advertisement, wherein the streaming of the gamified interactive content to the AR interface is performed in response to a determination that the user is viewing the at least one virtual object or based on a location of the AR-enabled device;
receive user interactions with the gamified interactive content in response to the information and education provided to the user, the user interactions including at least the one or more answers received from the user in response to the providing the information and the education associated with the product;
analyze the user interactions with the gamified interactive content to determine a portion of the information the user retains in association with the product, wherein the analyzing of the user interactions with the gamified interactive content includes using algorithmic matching with other users and historical interactions of the other users;
based on the analysis, provide rewards to the user according to predetermined rules; and
save the user interactions to a database; and
the database communicatively coupled to the processor, the database storing instructions executable by the processor.

* * * * *